(12) United States Patent
Cardullo

(10) Patent No.: US 8,078,774 B2
(45) Date of Patent: Dec. 13, 2011

(54) METHOD AND SYSTEM FOR TRACKING

(76) Inventor: Mario W. Cardullo, Alexandria, VA (US)

(*) Notice: Subject to any disclaimer, the term of this patent is extended or adjusted under 35 U.S.C. 154(b) by 459 days.

(21) Appl. No.: 12/133,722

(22) Filed: Jun. 5, 2008

(65) Prior Publication Data

US 2009/0216918 A1    Aug. 27, 2009

Related U.S. Application Data

(60) Provisional application No. 61/031,965, filed on Feb. 27, 2008.

(51) Int. Cl.
*G06F 3/00* (2006.01)
*G06F 13/12* (2006.01)
*G06F 13/38* (2006.01)

(52) U.S. Cl. .............................. 710/62; 710/9

(58) Field of Classification Search ................ 710/9, 62
See application file for complete search history.

(56) References Cited

U.S. PATENT DOCUMENTS

| 6,819,670 B1 * | 11/2004 | Fenner ........................... 370/392 |
| 7,149,658 B2 | 12/2006 | Kadaba |
| 2006/0091206 A1 * | 5/2006 | Olsen et al. .................... 235/384 |
| 2006/0244587 A1 * | 11/2006 | Humphries et al. ...... 340/539.13 |

FOREIGN PATENT DOCUMENTS

KR    10-2007-0093203    9/2007

OTHER PUBLICATIONS

Notification of Transmittal of International Search Report and Written Opinion of the International Searching Authority, or the Declaration, International Search Report and Written Opinion of the International Searching Authority, all mailed Sep. 30, 2009.

* cited by examiner

*Primary Examiner* — Chun-Kuan Lee
*Assistant Examiner* — Zachary K Huson
(74) *Attorney, Agent, or Firm* — McGuireWoods LLP; Charles J. Gross

(57) ABSTRACT

A system for tracking using electronic addresses is disclosed. The system stores an identification code, an electronic address, and a counter. The electronic address is made up of either single values or pairs of single values. A pair of single values for at least one of value of the counter is made up of a pseudonumber and a unique address value. The pseudonumber is able to be disentangled to produce a second pair of single values for a different value of the counter, thereby producing a tracking history.

31 Claims, 5 Drawing Sheets

METHOD AND SYSTEM FOR TRACKING

CROSS-REFERENCE TO RELATED APPLICATIONS

This Non-Provisional patent application claims benefit of U.S. Provisional patent application No. 61/031,965, filed Feb. 27, 2008, and entitled "METHOD AND SYSTEM FOR TRACKING," the disclosure of which is incorporated by reference herein in its entirety.

BACKGROUND OF THE INVENTION

1. Field of the Invention

The invention is directed to a method and system for tracking items based on a standardized electronic address. The item tracked may be a physical item, including but not limited to a package, a file, a shipping container, a truck, a ship, an airplane, a person, or an animal, or it may be electronic data, including but not limited to network data packets; frames; or files, such as a digital music file, a digital movie file, or digital rights management (DRM) implementations.

2. Related Art

Many systems and methods exist for tracking items such as packages or shipping containers. These systems typically utilize a central database or a group of databases to track movements on a large scale. These systems do not offer an ability to track individuals or items and determine all of the locations that they have visited without using a much larger database to store information on the same. Moreover, in order to relay information related to the tracked items or individuals, an input system (communication) to the database(s) could be extensive and problematic, due to e.g., bandwidth considerations.

For example, if a shipment travels from its origin to a final destination, it likely was loaded on a vehicle, deposited in a warehouse, reloaded on a transport such as a ship, unloaded at a dock, placed in another warehouse, and finally placed on a vehicle to its final destination. Accordingly, eight different locations may be involved, including point of origin and final destination. In various scenarios, many more locations could easily be involved. A person could conceivably visit hundreds of locations in a single day. Such detailed tracking may quickly overwhelm a standard, database-based tracking system and the system to acquire such information could be prohibitively complex. If a large number of people (and/or items) are being tracked, the system could become overwhelmed, since scaling could become a limiting factor.

Accordingly, there is a need for a method and system for tracking that is able to track an item across a large number of locations without generating unmanageable amounts of data.

SUMMARY OF THE INVENTION

The invention meets the foregoing need and allows tracking across a very large number of locations using mathematical concepts to compress the tracking data, which results in a significant increase in the number of locations that can be tracked and other advantages apparent from the discussion herein.

Accordingly, in one aspect of the invention, a system for tracking stores identification code, an electronic address, and a counter. The electronic address includes single values or pairs of single values. A pair of single values for at least one value of the counter may include a pseudonumber and a unique address value. The pseudonumber may be disentangled to produce a second pair of single values for a different value of the counter.

A tracking device may include the system described above. A digital rights management scheme may include the system described above. The electronic address may be selected from a group that includes an Internet protocol (IP) address, a media access control address (MAC), and a longitude-latitude coordinate.

According to another aspect of the invention, a method for tracking includes incrementing a counter, storing a first address, pairing a second address with the first address, and reversibly combining the two addresses to produce a pseudonumber.

The pseudonumber may additionally be paired with a third address. The addresses may be selected from a group that includes an Internet protocol address, a media access control address, and a longitude-latitude coordinate. The tracking method may be used in a tracking device or in a digital rights management scheme.

In yet another aspect, a method for tracking movement of a physical or an electronic (virtual) object is provided. The method includes a) storing in a memory associated with an object an address associated with a first location and a counter having an initial value, b) recognizing a next location and incrementing the counter and reversibly combining at least a subset of the address of the first location with at least a subset of an address associated with the next location to produce an aggregated address in the memory such that the aggregated address is recorded in a reversibly compressed format all addresses of every location, c) repeating step (b) for each next location and d) generating an output based on the aggregated address to provide an identity of every location for tracking the movement of the object.

In still another aspect, a system for tracking movement of an object is provided. The system includes a plurality of address components at different locations, each address component configured to provide an address indicative of the respective different location, the respective different locations including at least an originating location and at least one next location, an address reception component configured to receive the address when the object is proximate one of the address components, a processing component configured to store in a memory a received address associated with the originating location and to count each different location, the processing component further configured to recognize at least one next location based on the received address and to reversibly combine at least a subset of the received address associated with the first location with at least a subset of the address associated with the at least one next location to produce an aggregated address in the memory such that the aggregated address records in a reversibly compressed format each received address, and a decompressing component configured to generate an output by reversibly decompressing the aggregated address to provide an address of at least one location for tracking the movement of the object.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
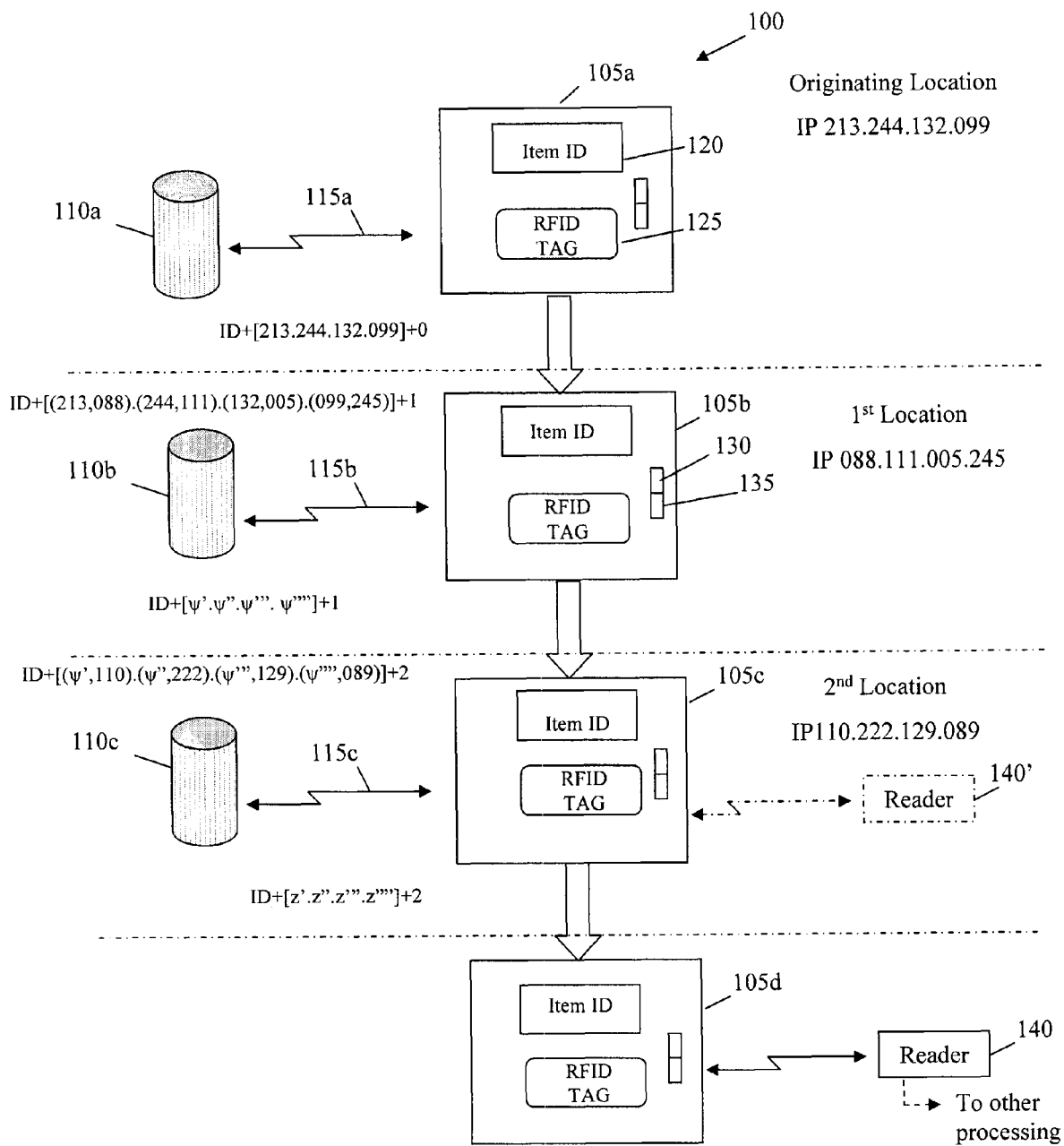
FIG. 1 is a functional block diagram of an example of a system constructed according to principles of the invention using a process according to principles of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also to be noted that as used herein and in the appended claims, the singular forms "a," "an," and "the" include the plural reference unless the context clearly dictates otherwise. Thus, for example, a reference to "an address" is a reference to one or more addresses and equivalents thereof known to those skilled in the art.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

Essentially every addressable device connected to a network such as the Internet has a unique numerical address assigned to it, such as an Internet Protocol (IP) address. Under Internet Protocol version 4, an IP address comprises a 32-bit number, generally written for human readability as four decimal numbers, referred to as octets (or sometimes octals), and separated by periods. Each octet has a value from 0 to 255. Not all locations or individuals have an IP address, but those that do have an assigned IP address, may participate in a unique tracking ability.

Similarly, media access control (MAC) addresses, which are unique numbers assigned to every network adapter or interface connecting to a network, may be used with the method and system described herein. Other address schemes are contemplated and are within the scope of the invention, including but not limited to Internet Protocol version 6 (IPv6) addresses (a 128-bit based numbering scheme), global positioning system (GPS) coordinates (longitude and latitude), and other schemes whereby the address format may be partitioned into physical or logical subsets of address fields. However, to simplify the description below, only the IP address embodiment will be discussed in detail.

Tracking the locations that an item may be achieved by knowing or recognizing the various IP addresses assigned or associated with the locations traversed. One way that this might be accomplished is to store the tracking information in a database, which may have to be a very large database, depending on the application. In an application having a large number of items to be tracked and/or a very large number of possible locations which might be traversed, the number of tracked location instances could be extremely large. Moreover, the number of end-points in such a system that may be required to communicate tracking information of a physical item to the database could be extensive. So there are practical limitations (e.g., cost and support issues) to such an approach.

However, to overcome these limitations, the method and system provided herein enables an "item" to carry or remember its own tracking information (e.g., stored on an RFID tag associated with the item), obviating the problems associated with using a central database (e.g., communications and storage issues). Since the tracking memory is provided on each item to be tracked, the memory for storing the tracking information could be limited (e.g., a RFID tag typically has limited memory capacity). The system and method of the invention include a technique for efficiently recording the tracking information for the item, which may be a form of lossless compression ("address compression methodology"), described in more detail below.

According to an embodiment of the invention, the tracking device may store three pieces of information: an identification code (ID) assigned to an item, an address sequence (ADD SEQ) of the item, and a location counter (Z) for the item. The location counter may be a number representing the number of locations visited by the item. That is, the location counter Z may be incremented when arriving at or transiting a tracked location. Thus, a counter value of zero (0) may correspond to the origination location, a counter value of one (1) may indicate a first location arrival or transit location, a counter value of two (2) may indicate that a second location had been reached or transited, etc.

For example, using simplified IP addresses for ease of explanation, consider a tracking device with an ID represented as $\ominus$ and an origination point with an IP address of [1.2.3.4]. The device may store the data in form of ID+ADD SEQ+Z, so in this example, the device may store $\ominus$+[1.2.3.4]+0. If the device then moves to a location with an IP address of [5.6.7.8], the two IP addresses may be stored as the ADD SEQ. Accordingly, internal data for the device will now contain information: $\ominus$+[(1,5).(2,6).(3,7).(4,8)]+1.

When the tracking device is moved to a second location, the two IP addresses, i.e. the IP address associated with the first location and the IP address associated with the second address, may be combined using an algorithm that allows the IP addresses to be disentangled (or decoded), which results in a pseudonumber represented as $\alpha$. If the IP address for the second location is [9.10.11.12], then the internal data in the memory associated with the tracking device will be $\ominus$+[($\alpha'$, 9). ($\alpha''$,10). ($\alpha'''$,11). ($\alpha''''$, 12)]+2. As the tracking device moves to subsequent locations, the above process may be repeated, so that at the nth location, the stored tracking data would be $\ominus$+[($\alpha'$,X'). ($\alpha''$,X''). ($\alpha'''$,X'''). (a'''', X'''')]+n, where X represents a respective octet from an IP address for a current location of the tracking device. If the value of $\alpha$ is constrained to values between 0 and 255 (e.g., similar to as the octets of an IP address), then there may be 65,025 possible combinations of the address sequence ($\alpha$,X).

To reveal the IP addresses of all the locations visited, the device may simply work backwards from the current value of the address sequence and the location counter. For all addresses where the counter value Z is greater than 2, each pair of octets may contain a pseudonumber followed by a unique address. By reversing the algorithm used to combine the octets, an address sequence pair ($\alpha'$,X') at Z=(n−1) may be extracted from the pseudonumber $\alpha'$ at Z=n. The tracking device (or other device performing the extraction) can continue to decrement the location counter and step backwards through all values of the location counter to extract all of the IP addresses that the device has visited, down to the device's origination location.

In another embodiment, since each octet in an IP address might range from "0" to "255," each of the four unique combined numbers could have up to 255 different combinations. The combined numbers could have a form as complicated as, for example:

$$[(123,199).(245,240).(0,9).(166,25).(99.122)]$$

To combine these numbers may be straight forward, however to decode the numbers could be difficult without an algorithm. In this embodiment, a symbol, such as, e.g., a letter from one of many alphabets (e.g.; English, Greek, Cyrillic, etc.) may be assigned to the combined numbers. For example, the following assignment may be made:

$$A=(0,0), B=(1,0), C=(0,1), \text{ and so forth.}$$

Given:

$$\pi'' = \alpha_1 \alpha_2 \alpha_3 \beta_1 \beta_2 \beta_3$$

Where $\alpha_1 \alpha_2 \alpha_3$ would represent the prior position octet from "z−1", and would represent $y_1$ $y_2$ $y_3$ and the prior unique address from that octet at "z−1". Similarly $\alpha_1'$ $\alpha_2'$ $\alpha_3'$ would represent $y_1'$ $y_2'$ $y_3'$ and the prior unique address from that particular octet at "z−1" address and so on.

As an example, $\phi_1$, $\phi_2$ $\phi_3$, 242) could be represented by a letter such as $\psi'$ which then with the counter can be disassembled. So, this algorithm within a scanner (or, a reader, or computer process) could easily disassemble a particular address. For the combination of ($\phi_1$ $\phi_2$ $\phi_3$, 242), 65,025 unique symbols would be necessary.

Therefore, knowing the number of times a tracking device has moved (to new locations), digits, or letters, disassembly of a compressed address, such as in the brackets above, is possible. The location sequence could be represented by:

*ID+IP* location sequence+counter

Or,

*ID+$\psi'$+counter*, where $\psi'$ is the sequence of IP addresses.

FIG. 1 is a functional block diagram of an example of a system constructed according to the principles of the invention, generally denoted by reference numeral 100. The item 105, such as a product, a person or an article associated with a person, an animal, an article, a device, or the like) is shown moving across a plurality of locations (e.g., an originating location, a first location, and a second location, Nth location). The functional block diagram may also be considered a flow diagram showing certain steps that may be performed according to the principles of the invention. An item 105 having an item ID 120 at an originating location may be moved to a next location such as a first location then to a second location, for example. A plurality of tracking devices 110a-c may provide address information to an address reception component 125, such as found in relation to radio-frequency identification (RFID) tags. The plurality of signals 115a-c communicates respective address information for different locations, such as, for example, the IP address of the respective tracking device 110a-c. As shown, the originating location tracking device 105 may have an IP address, for example, "213.244.132.099." The first location tracking device 110b may have an IP address, for example, "088.111.005.245." The second location tracking device 110c may have an IP address, for example, "110.222.129.089." Each of the tracking devices 110 may be configured to provide an address indicative of the respective different location (i.e., originating location, $1^{st}$ location, $2^{nd}$ location, etc.). When a system component such as the tracking devices are configured to provided an address indicative of respective different locations, the system component may be, for example, a hardware component or may be a software component embedded within a computer platform configured to provide an address indicative of a respective location by communication techniques which may be accomplished by wireless techniques or by messaging such as found within computer networks.

A processing component 130 may be provided on (or in) the item 105 (or even external to the item in some applications) to process the received address information (e.g., the IP address of one or more tracking devices 110a-c) according to the location tracking compression algorithms described above. In some embodiments, the processing component 130 may be separate from the item, such as on an external device. The processing component 130 may be configured to recognize and account for different locations based on received addresses, and to calculate aggregated tracking information. The resulting calculated aggregated tracking information may be stored in a memory 135 of a particular item.

By using the memory 135, a centralized database to capture tracking information may be minimized or avoided entirely, which for a large number of tracked items could be extensive. The processing component 130 may include a decompressing software component 132 or routine to decompress aggregated tracking data, as described more below. Alternatively, the decompressing component 132 may be external to the item 105, perhaps associated with reader 140.

When contrasted with a central database technique, the memory 135 may be viewed as a type of "distributed database" that is automatically scalable, or self-scaling. The "distributed database" may be related to the number of items or objects being tracked, since each item or object provides its own memory.

The aggregated tracking data stored in the memory 135 of a particular item may be subsequently read for decoding by an external computing device 140. The external computing device 140 may be a computer or server that may be configured to disassemble the aggregated information in a reverse manner. The external computing device 140 computes the sequence of locations that the item 105 traversed by decoding the aggregated tracking data. The external computing device may generate a report of the actual physical (or logical) locations traversed by the item based on the decoded IP address(es) accumulated by the item 105. The resulting decoded IP address(es) may then be mapped to actual real-world locations, if appropriate, based upon a mapping database (not shown) that identifies the physical locations or assignments (e.g., a company name or person) for each IP address.

If the item 105 is an electronic item, such as, for example, a file, a message, or a digital container having electronic content controlled by digital rights management, the decoded mapping based on the aggregated tracking information may be configured to produce other types of information, such as, for example, logical points in a network, a country, a translation instance from one type of protocol to another such as found in gateway functionality, a firewall, a computer, or the like.

Figure 2:
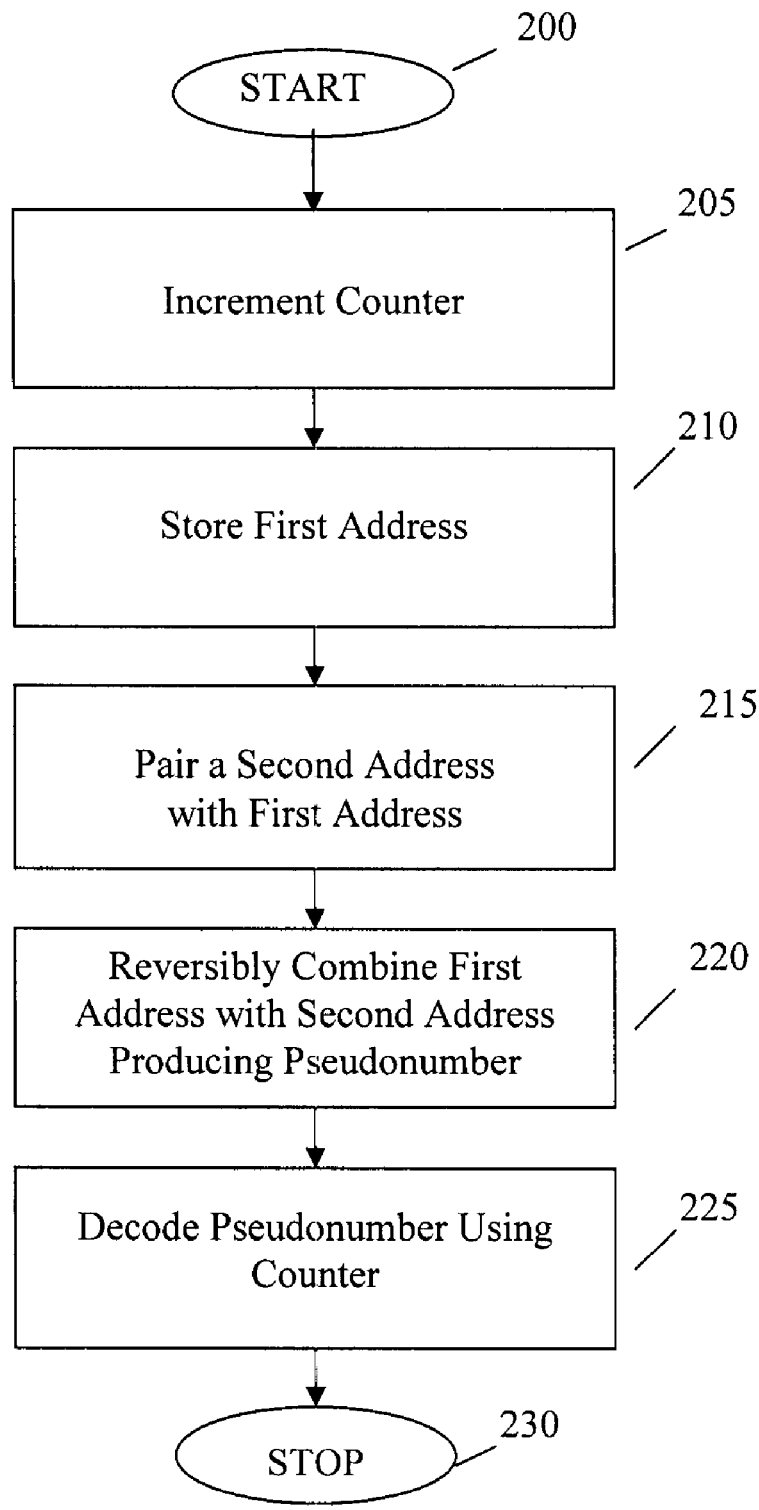
FIG. 2 is a flow diagram of an example of a process according to an embodiment of the invention.

FIG. 2 is a flow diagram of an example of a process according to an embodiment of the invention, starting at step 200. The process may employ principles of the address compression methodology, as described previously. FIG. 2, as well as all other flow diagrams herein, may also be a block diagram of the components for performing the steps thereof, including, but not limited to for example, hardware, software or any combinations thereof. The components may be executed on an appropriated computer medium, including, for example, a computer processing platform, an electronic circuit, or stored in a computer readable memory such as a hard drive, a ROM, a RAM, a CD or a DVD, or the like.

Continuing with FIG. 2, at step 205, a previously initialized counter may be incremented. This may be when a new or "first" location is recognized related to movement of an item. At step 210 a first address may be stored in a memory for the first location. At step 215, a second address may be paired with the first address, or a subset(s) of the first and the second addresses may be paired. At step 220, the first address and the second address (or the subset(s)) may be reversibly combined to produce a pseudonumber. The pseudonumber and counter may be stored. At step 225, the psuedonumber may be decoded using the counter to produce a history of addresses. The decoding may take place internal to a device aggregating the reversible combining the first and second addresses to produce the pseudonumber, or the decoding may take place external to such a device, such as a separate computing platform.

The process may continue iteratively when a new (e.g., a third, a fourth, etc.) location is recognized, and reversibly combining the pseudonumber with the new address to produce a new pseudonumber which may be decoded to produce a history of addresses.

Figure 3:
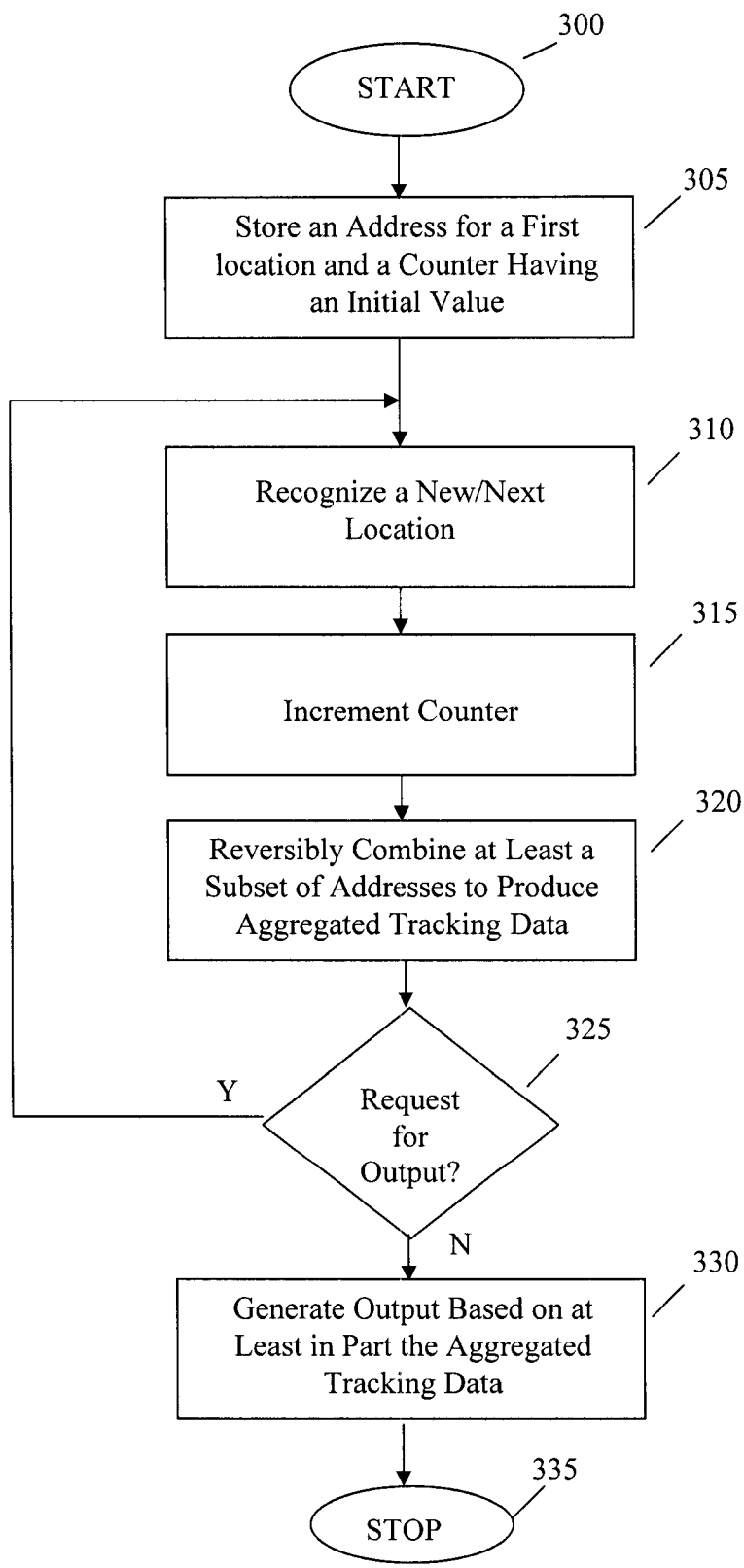
FIG. 3 is a flow diagram of an example of a process according to another embodiment of the invention.

FIG. 3 is a flow diagram of an example of a process of an embodiment of the invention, starting at step 300. The process may employ principles of the address compression and decompression methodology, as described previously. At step 305, an address for a first location (typically an originating location) may be stored along with a counter value having an initial value, such as for example, zero (0). At step 310, a new/next location may be recognized (e.g., using RFID technology). At step 315, the counter value may be incremented to count the new location. At step 320, at least a subset of the previous (which may be the originating location address or the aggregated address) location address may be reversibly combined with at least a subset of the address (e.g., a second address) for the new/next recognized location to produce an aggregated address. At step 325, a check may be made whether or not a request to produce an output has been made. If not, processing continues at step 310 to process any new/next locations. However, if a request was made for an output, then at step 330, an output may be generated based at least in part on the aggregated address. The output generation may be accomplished onboard a device (e.g., device 105) performing the process (e.g., steps 305 to 310) or may be generated by transmitting the aggregated address and counter value to an external computer (e.g., reader 140) for decompressing and generation of tracked locations. The counter value may also be used to decode the aggregated address to produce a tracking history. At step 335, the process ends.

Although, the check at step 325 is shown as a serial operation, the check may be implemented as a parallel type process or an asynchronous type process so that a request for an output might occur at any point in the process.

The aggregated tracking information provides for a compressed storage technique to record a history of a plurality of addresses as compared with a technique that records addresses in an uncompressed format (i.e., full operational addresses), such as might be done, for example, when using a common database. The aggregated tracking technique provides for reversibly encoding/decoding multiple addresses using a significantly reduced amount of storage, as compared with other known techniques like a central database or other uncompressed storage techniques.

Figure 4:
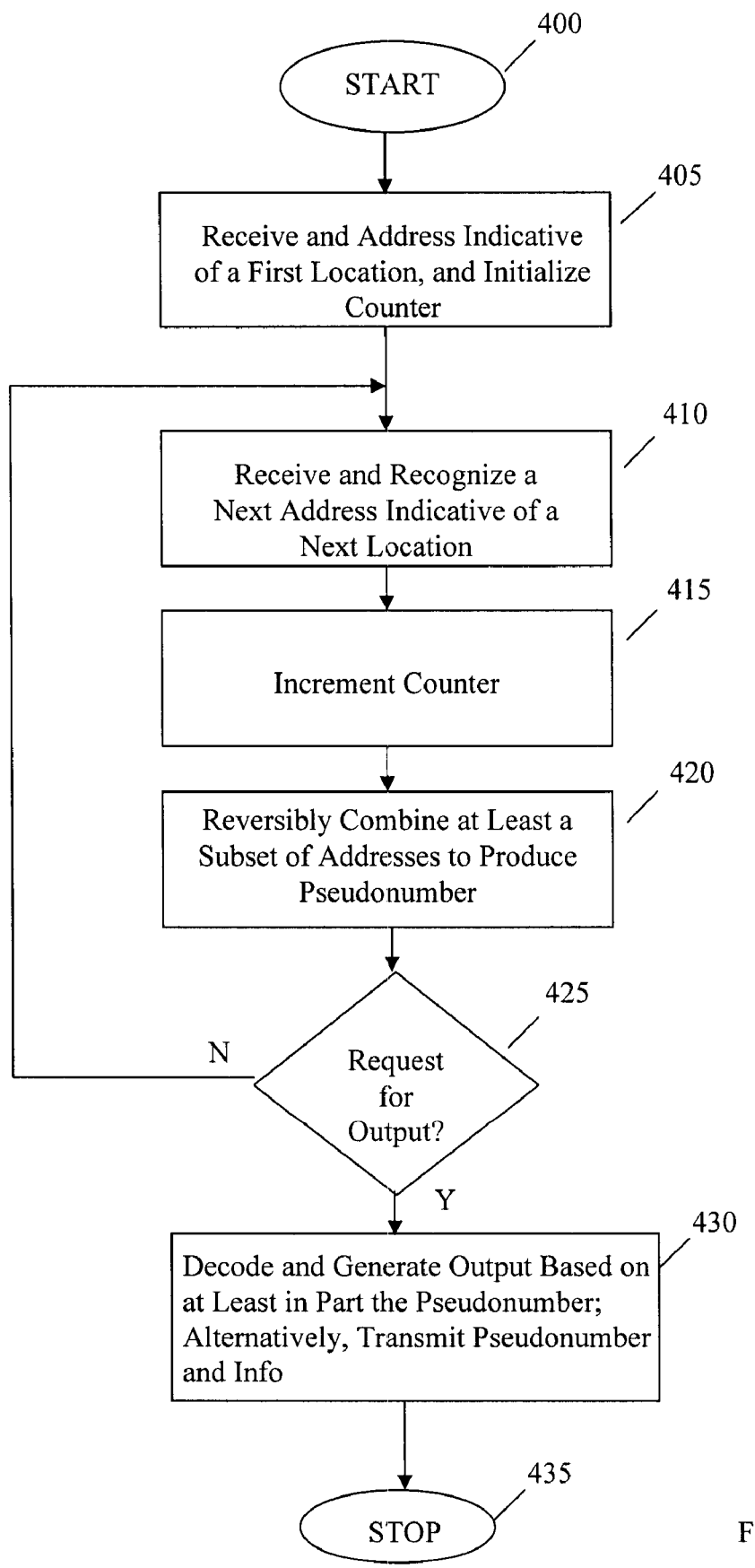
FIG. 4 is a flow diagram of an embodiment showing another process of the invention.

FIG. 4 is a flow diagram of an embodiment showing another process of the invention, starting at step 400. The process may employ the principles of the address compression techniques and associated decompression techniques, as described previously, such as the description in reference to FIG. 1, and related algorithms, for example. At step 405, an address indicative of a first location may be received and stored by a device configured to track location history in a compressed manner, according to principles of the invention described previously. A counter may be initialized and stored in a memory (or a database). At step 410, an address indicative of a next location may be received and recognized. This may be achieved, for example, by way of a received communication from a sending device or other input at the next location, such as found when using RFID technology, for example. At step 415, the counter may be incremented to record the recognized next location.

At step 420, at least a subset of the stored address (which may be the address associated with the first location, or a compressed address represented by a pseudonumber of a plurality of recognized addresses) may be reversibly combined with at least a subset of the recognized next address to produce a new pseudonumber, which may be stored. At step 425, a check is made whether or not a request has been made to produce an output. If no request has been made, then the process may continue at step 410. However, if a request is made to generate an output, which may include a request to reverse (decode) the compressed addresses represented by the pseudonumber, at step 430, output may be generated based at least in part on the pseudonumber; alternatively, the pseudonumber, counter and optionally other information such as the device ID may be transmitted to another computing device for further processing. The external device may reversibly decode the pseudonumber using the received information to produce a tracking history of the tracking device, and optionally provide mapping information based on the resulting decoded addresses to produce other physical map information such as city or other identifying location information. Reversing the combining process using the pseudonumber and the counter results in a tracking history of the addresses accumulated during the combining sequences. At step 435, the process stops.

The check for the request for output (i.e., step 425) is illustratively shown as a sequential check; however, this check may be performed in parallel or performed asynchronously, and could occur anytime in the process with subsequent output being generated. This may occur, for example, when a tracked item reaches some terminal or interim location responsible for acquiring the tracking history as stored.

Figure 5:
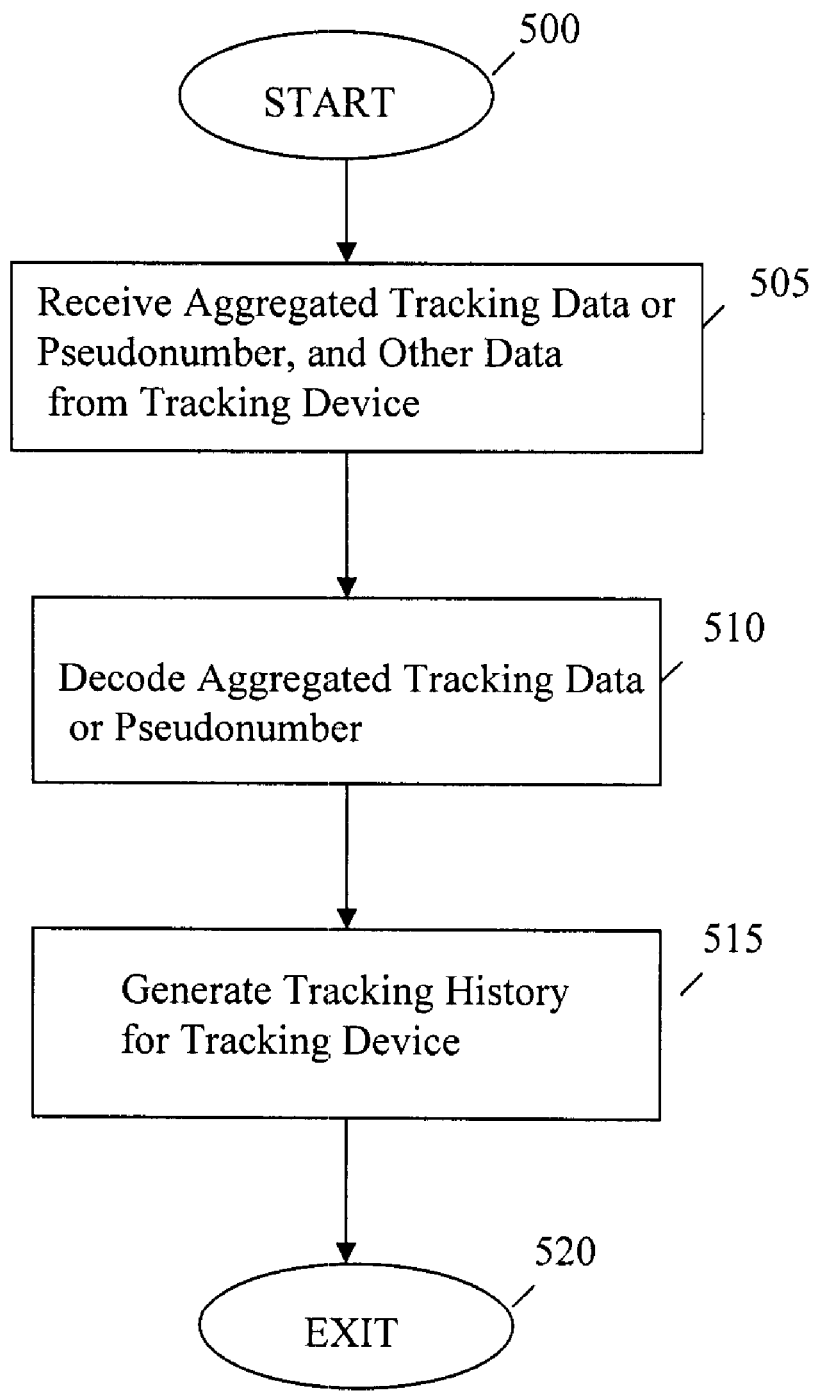
FIG. 5 is a flow diagram of an embodiment showing steps of another process of the invention.

FIG. 5 is a flow diagram of an embodiment showing steps of another process of the invention, starting at step 500. At step 505, aggregated tracking data or pseudonumber and other data such as a counter value and optionally a device identifier may be received at a computing platform from a tracking device configured to track traversed locations using a compressed address technique described herein. The communication technology to convey this information from the device to the computing platform may be any one of a number of technologies that may be suitable for the tracking device, but a preferred technology is RFID technology. Although this communication may occur at any convenient time and location, it might occur whenever the tracking device has reached a pre-determined destination that may be designated and configured to receive and decode the compressed tracked addresses within the tracking device. At step 510, the aggregated tracking data or pseudonumber may be reversibly decoded to produce a sequence of actual addresses (indicative of traversed locations) received and stored by the tracking device. At step 515, a tracking history may be generated based on the decoded actual addresses and might include a mapping to actual physical designations such as geographical locations and the like. At step 520, the process exits.

While the method and system described above referred to the tracking of an item or object, such as a physical package or item, it should be clear that the invention may also track electronic data items across communication mediums, such as the Internet. For example, every time a digital audio file is played, it may store the IP address of the current computer, according to the above system and method. This may allow the administrator of a dynamic digital rights management (DRM) scheme to track the use of and/or forwarding of (from one computer to another) individual files (or even messages) across the Internet. Also, as the IP address of a personal computer may change frequently (due to, e.g., "dynamic" IP addressing), a DRM scheme using the invention may be expanded to also record the date and time at which the file was played.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

According to an aspect of the invention, a computer program may be provided on a computer readable medium that comprises a plurality of code sections for carrying out the process shown in FIG. 2. In particular, a computer program may be provided that includes a code section for carrying out each of the steps 200-230.

What is claimed is:

1. A system for tracking an item that traverses a plurality of locations, the system comprising:
    an address reception component configured to receive an electronic address, the address reception component associated with an item being tracked, and the electronic address being indicative of a location; and
    a storage physically associated with the item that stores an identification code, the received electronic address, and a counter value;
    wherein
    the electronic address comprises single values or pairs of single values,
    the pair of single values associated with at least one counter value comprises a pseudonumber and a unique address value, and
    the pseudonumber is arranged to be disentangled to produce a second pair of single values for a different value of the counter.

2. A tracking device that includes the system of claim 1.

3. A digital rights management system that includes the system of claim 1.

4. The system of claim 1, wherein the electronic address comprises at least one of a type selected from the group comprising: an Internet protocol address, a media access control address, and a latitude-longitude coordinate.

5. A method of tracking an item that traverses a plurality of locations, the method comprising:
    receiving a first address;
    incrementing a counter value;
    storing an identification code, the received first address and the counter value in a storage that is physically associated with an item being tracked, the received first address being indicative of a first location;
    pairing a second address with the first address, wherein the second address is associated with a second location; and
    reversibly combining the first address with the second address to produce a pseudonumber, wherein the pseudonumber is arranged to be disentangled to reproduce the first address and the second address based on the counter value.

6. The method of claim 5, further comprising pairing the pseudonumber with a third address associated with a third location.

7. The method of claim 5, wherein the electronic address comprises at least one of the types selected from the group comprising an Internet protocol address, a media access control address, and a latitude-longitude coordinate.

8. A digital rights management method comprising the method of claim 5.

9. A method for tracking movement of items, the method comprising:
    a) storing in a memory associated physically with an item being tracked, an address associated with a first location and a counter value;
    b) recognizing a next location and incrementing the counter value and reversibly combining at least a subset of the address of the first location with at least a subset of an address associated with the next location to produce an aggregated address in the memory such that the aggregated address records in a reversibly compressed format all addresses of every location;
    c) repeating step b) for each next location; and
    d) generating an output based on the aggregated address to provide an identity of every location for tracking the movement of the item.

10. The method of claim 9, wherein the item is a physical object.

11. The method of claim 9, wherein the item is an electronic object.

12. The method of claim 9, wherein the reversibly compressed format encodes a pair of addresses, each of the pair of addresses representing different locations.

13. The method of claim 9, wherein the aggregated address is reversibly decodable based at least in part on the counter value.

14. The method of claim 9, wherein the address associated with the first location is an Internet Protocol (IP) address.

15. The method of claim 9, wherein the address associated with the next location is an Internet Protocol (IP) address.

16. The method of claim 9, wherein the address associated with the first location is a global positioning system GPS coordinate.

17. The method of claim 9, wherein the address associated with the next location is a global positioning system GPS coordinate.

18. A system for tracking movement of an object, comprising:
 a plurality of address components at different locations, each address component configured to provide an address indicative of the respective different location, the respective different locations including at least an originating location and at least one next location;
 an address reception component at an object being tracked and configured to receive the address when the object is proximate one of the address components;
 a processing component configured to store in a memory a received address associated with the originating location and to count each different location, the processing component further configured to recognize at least one next location based on the received address and to reversibly combine at least a subset of the received address associated with the first location with at least a subset of the address associated with the at least one next location to produce an aggregated address in the memory such that the aggregated address records in a reversibly compressed format each received address; and
 a decompressing component configured to generate an output by reversibly decompressing the aggregated address to provide an address of at least one location for tracking the movement of the object.

19. The system of claim 18, wherein the processing component is further configured to recognize another next location based on the received address and to reversibly combine at least a subset of the received address associated with the another next location with at least a subset of the aggregated address in the memory such that the aggregated address is updated to record in a reversibly compressed format each received address.

20. The system of claim 18, wherein the reversibly compressed format encodes a pair of addresses, each of the pair of addresses representing one different location.

21. The system of claim 18, wherein the aggregated address is reversibly decodable based at least in part on a value of the counter.

22. The system of claim 18, wherein the address associated with the first location and the address associated with the next location is one of an Internet Protocol (IP) address and a media access control address (MAC).

23. The system of claim 18, wherein the address associated with the first location is a global positioning system GPS coordinate.

24. The system of claim 18, wherein the address associated with the at least one next location is a global positioning system (GPS) coordinate.

25. The system of claim 18, wherein the system recognizes the at least one next location utilizing radio frequency identification (RFID) techniques.

26. The system of claim 18, wherein the first location is an originating location and the address associated with at least one location is acquired based on radio frequency identification (RFID) technology.

27. The system of claim 18, wherein the address reception component and the processing component are embedded as part of the object, the system further comprising a reader external to the object to receive contents of the memory for decoding the aggregated address.

28. The system of claim 27, wherein the decoding provides a tracking history of the object.

29. The system of claim 18, wherein the object is a physical object.

30. The system of claim 1, wherein the address receiving component is configured to receive the electronic address utilizing radio frequency identification (RFID) techniques.

31. The system of claim 1, wherein the location is one of a logical location and a physical location.

* * * * *